Patented Oct. 20, 1931

1,828,055

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

CHROMIFEROUS AZO-DYESTUFFS

No Drawing. Application filed July 26, 1930, Serial No. 471,087, and in Germany August 30, 1929.

The present invention relates to chromiferous azo dyestuffs and process of producing same.

I have found that valuable chromiferous dyestuffs are obtained by treating the ortho-hydroxyazo dyestuffs obtainable from diazotized ortho-aminocresol sulphonic acids free from further substituents and 1-phenyl-3-methyl-5-pyrazolone in substance with agents supplying chromium. The azo dyestuffs accordingly correspond to the formula:

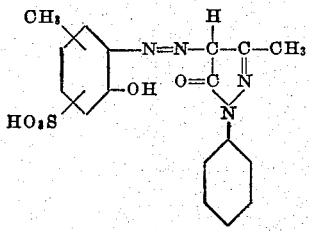

The chroming of the ortho-hydroxyazo dyestuffs can be effected in a great variety of ways, as for example by boiling the dyestuffs with chromium acetate, formate or fluoride under a reflux condenser or by heating under pressure. The chroming may also be carried out with salts of hexavalent chromium for example by heating the dyestuffs with chromate with or without an addition of reducing agents and/or alkali binding agents.

The dyestuffs so obtained dye wool from acid baths usually red shades. The dyeings thus obtained have an excellent fastness to light, washing and fulling and possess good evenness.

The following example will further illustrate the nature of this invention, but the invention is not restricted to this example. The parts are by weight.

Example

About 39 parts of the azo dyestuffs obtainable from 3-amino-4-cresol-5-sulphonic acid and 1-phenyl-3-methyl-5-pyrazolone are boiled in aqueous solution for about 20 hours under a reflux condenser or heated for about 2 hours in an autoclave to 120° C. with from about 20 to 22 parts of a chromium oxide paste containing 27 per cent of $Cr_2O_3$ and from 10 to 11 parts of an 85 per cent formic acid. The chromium compound obtained is salted out if necessary and dried. The chromed dyestuffs thus obtained dyes wool very evenly and yields a red shade with excellent properties of fastness. The chroming may also be carried out in the presence of dissolved salts as for example common salt.

The ortho-hydroxyazo dyestuffs obtainable from diazotized 3-amino-4-cresol-6-sulphonic acid and 1-phenyl-3-methyl-5-pyrazolone may be chromed in an analogous manner. The chromium compound thus obtained possesses similar properties to those hereinbefore described in this example.

What I claim is:—

1. As new articles of manufacture complex chromium compounds of azo dyestuffs corresponding to the formula:

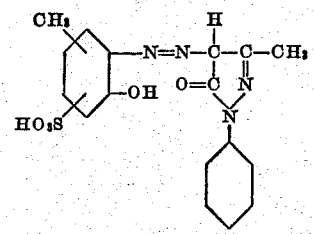

dyeing wool from acid baths even red shades.

2. As a new article of manufacture the complex chromium compound of the azo dyestuffs corresponding to the formula:

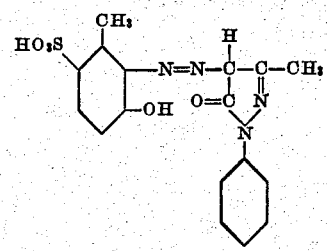

dyeing wool even red shades.

In testimony whereof I have hereunto set my hand.

HANS KRZIKALLA.